United States Patent [19]
Goyet

[11] Patent Number: 4,677,555
[45] Date of Patent: Jun. 30, 1987

[54] METHOD AND EQUIPMENT FOR AUTOMATIC GUIDANCE OF EARTHMOVING MACHINES AND ESPECIALLY MACHINES FOR LAYING DRAINAGE ELEMENTS

[75] Inventor: Noël Goyet, Paris, France

[73] Assignee: Syndicat National des Entreprises de Drainage, Les Ulis, France

[21] Appl. No.: 673,502

[22] Filed: Nov. 20, 1984

[30] Foreign Application Priority Data

Nov. 28, 1983 [FR] France ................. 83 18909

[51] Int. Cl.⁴ .................................... E02F 9/20
[52] U.S. Cl. .................... 364/424; 37/DIG. 1; 356/1
[58] Field of Search ........... 364/424, 433, 434, 559; 356/1, 4, 141, 152, 143; 37/DIG. 1, DIG. 2, DIG. 19, 86; 33/366

[56] References Cited

U.S. PATENT DOCUMENTS

| | | | |
|---|---|---|---|
| 3,924,107 | 12/1975 | Sakai | 364/424 |
| 3,997,071 | 12/1976 | Teach | 364/433 |
| 4,028,822 | 6/1977 | Teach | 37/86 |
| 4,029,415 | 6/1977 | Johnson | 356/1 |
| 4,034,490 | 7/1977 | Teach | 37/DIG. 19 X |
| 4,050,171 | 9/1977 | Teach | 37/DIG. 1 X |
| 4,129,224 | 12/1978 | Teach | 37/DIG. 1 X |
| 4,212,534 | 7/1980 | Bodlaj | 356/1 |
| 4,244,123 | 1/1981 | Lazure et al. | 37/193 |
| 4,299,290 | 11/1981 | Nunes, Jr. | 172/448 |
| 4,494,870 | 1/1985 | Hertschel et al. | 356/152 |

Primary Examiner—Errol A. Krass
Assistant Examiner—Thomas G. Black
Attorney, Agent, or Firm—Young & Thompson

[57] ABSTRACT

The method for automatic guidance of a machine of the crawler type for laying drainage piping or any similar earthmoving machine consists in preliminary recording, in digital form and on a moving magnetic recording medium, of all the planimetric and altimetric data relating to the operations to be performed with reference to datum points and to reference plane. There are then placed on the ground of the drainage site fixed beacons for marking the location of the selected datum points as well as a rotating laser beam emitter for defining the desired reference plane. The crawler machine to be guided is equipped with a microprocessor control-module for reading the indications recorded on the magnetic recording medium and controlling two guidance devices, one device being employed for planimetric guidance of the crawler machine and the other device being employed for altimetric guidance of the drain-laying or digging tool of the machine. These two control devices produce action respectively on the steering control of the machine and on the system for controlling the height-setting of the tool with reference to the fixed locating beacons and to the plane defined by the rotating laser beam.

12 Claims, 5 Drawing Figures

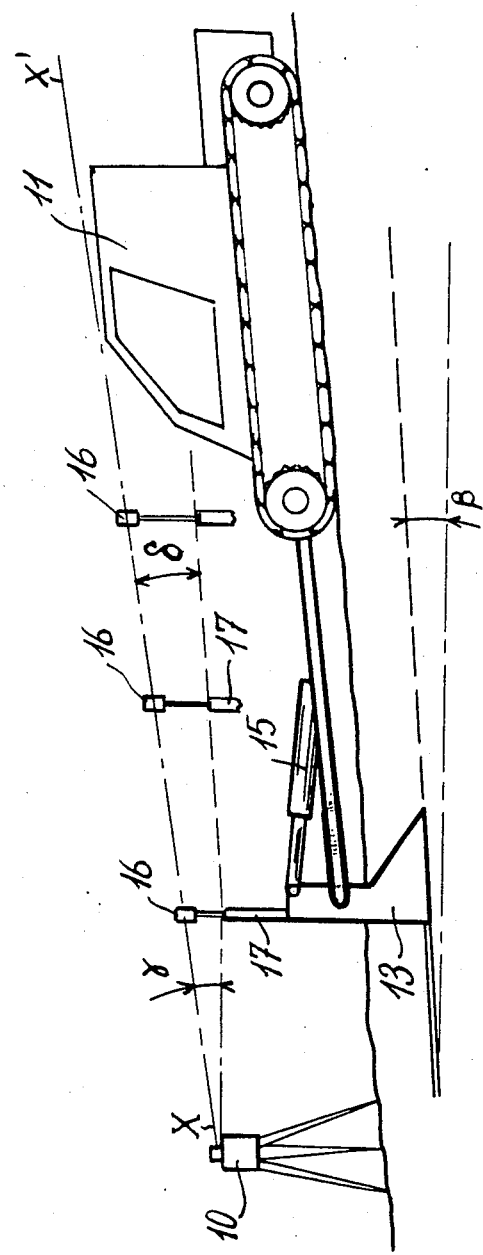

METHOD AND EQUIPMENT FOR AUTOMATIC GUIDANCE OF EARTHMOVING MACHINES AND ESPECIALLY MACHINES FOR LAYING DRAINAGE ELEMENTS

BACKGROUND OF THE INVENTION

1. Field of the Invention

The present invention relates to guidance of earthmoving machines and especially machines employed for laying drainage elements.

2. Description of the Prior Art

Machines of this type are used for the drainage of agricultural land by burying in the ground on the one hand a series of drains disposed in parallel relation to catch excess water in the ground and on the other hand mains or header pipes which are disposed transversely with respect to the drains and to which the latter are joined in order to convey drained water to an outfall. To this end, a machine of this type is provided with a coulter for forming a furrow in the ground as well as a system for laying drainage elements placed behind said coulter and subsequently buried in the ground. However, in order to permit the flow of collected water from the drains into the header pipes, these different drainage elements must be laid at a suitable angle of slope or gradient down to the outfall.

Under these conditions, any drainage site entails the need for a design study with a view to establishing a preliminary project for determining the planimetric location line of each drain or header with its altimetric profile. In the case of each drain section or header section, this project is defined by:

the planimetric coordinates of its origin and of its end;
the height of its origin (or its depth with respect to the natural ground);
the slope (gradient) and length of the segments constituting the longitudinal profile.

This project also mentions the planimetric coordinates of certain points which give rise to special operations such as, for example, a change in nature of the material employed (change in diameter of piping, use of a perforated or non-perforated pipe) or else the addition of a predetermined accessory such as, for example, an inspection hole and the like.

At the time of laying of drainage elements, it must be ensured that the laying machine is suitably guided over the ground in order to follow a series of paths corresponding to the intended locations of the different drainage elements and also that the level of its drain-laying tool in the ground is so adjusted as to conform to the profile which has been established for these drainage elements.

The method in use at the present time consists first in marking out on the ground by means of stakes and by conventional topographic methods all the characteristic points of the planimetric location line of the drainage project. It is then only necessary for the operator of the drain-laying machine to follow the alignment of corresponding stakes by sight in order to comply with the planimetric line.

In regard to compliance with the altimetric profile, this is obtained on the ground with respect to a reference plane which is inclined to the horizontal and is generated by a rotating laser beam emitter. To this end, the drain-laying tool comprises a receiver for detecting the passage of the laser beam. Under these conditions, the drain-laying machine operator must read the gradient of the drain section concerned on the project layout plan and consequently adapt the guidance gradient assigned by the laser beam emitter. After this preliminary adaptation, the equipment provided automatically maintains the drain-laying tool at the chosen angle of slope.

This method therefore calls for a large number of preliminary operations, thus producing a corresponding rise in capital costs for drainage work. The most time-consuming operations are clearly those which involve marking the planimetric line on the ground by placing a sufficient number of stakes.

SUMMARY OF THE INVENTION

For the reasons given above, the aim of the present invention is to eliminate these different preliminary staking-out operations as well as the operations which have been required up to the present time for adapting the position of the drain-laying tool.

To this end, the invention relates to a method for automatic guidance of a machine for laying drainage elements or of any other earthmoving machine designed to perform similar operations. This method essentially comprises the following operations which consist:

(a) in the preliminary recording, in digital form and on a suitable magnetic recording medium (disk, cassette, and so on) of all the planimetric and altimetric data relating to the operations to be performed with reference to datum points and to a reference plane which are chosen in an arbitrary manner;

(b) in placing fixed beacons on the ground in order to mark the location of the selected datum points as well as a rotating laser beam emitter which is capable of defining the desired reference plane;

(c) in installing on the earthmoving machine a microprocessor control-module which is capable of reading the indications recorded on the magnetic recording medium employed and consequently of controlling two guidance modules as follows:

one module for planimetric guidance of the corresponding machine;
and the other module for altimetric guidance of the digging tool of this machine.

The two control modules are capable of producing action respectively on the steering control of the machine and on the system for controlling the height location of the digging tool with reference to the fixed locating beacons and to the plane defined by the rotating laser beam. Thus the earthmover such as, for example, a machine for laying drainage elements is guided along the ground in such a manner as to ensure that both the machine and its drain-laying tool or digging tool conform both to the planimetric line and to the altimetric line of the project to be executed.

A further object of the invention, however, is to provide control equipment which is specially designed for the practical application of the method under consideration. The different features of this equipment and of the method in accordance with the invention will become apparent hereinafter.

BRIEF DESCRIPTION OF THE DRAWINGS

Consideration will be given to the following description and accompanying drawings, wherein:

FIG. 5 is a schematic view in elevation to a different scale which also illustrates this second mode of guidance.

DETAILED DESCRIPTION OF THE INVENTION

As has already been mentioned, the first operation for the practical application of the method in accordance with the invention consists in recording, in digital form and on a moving magnetic recording medium (disk, cassette and the like), all the planimetric and altimetric data relating to the operations to be performed.

Figure 3:
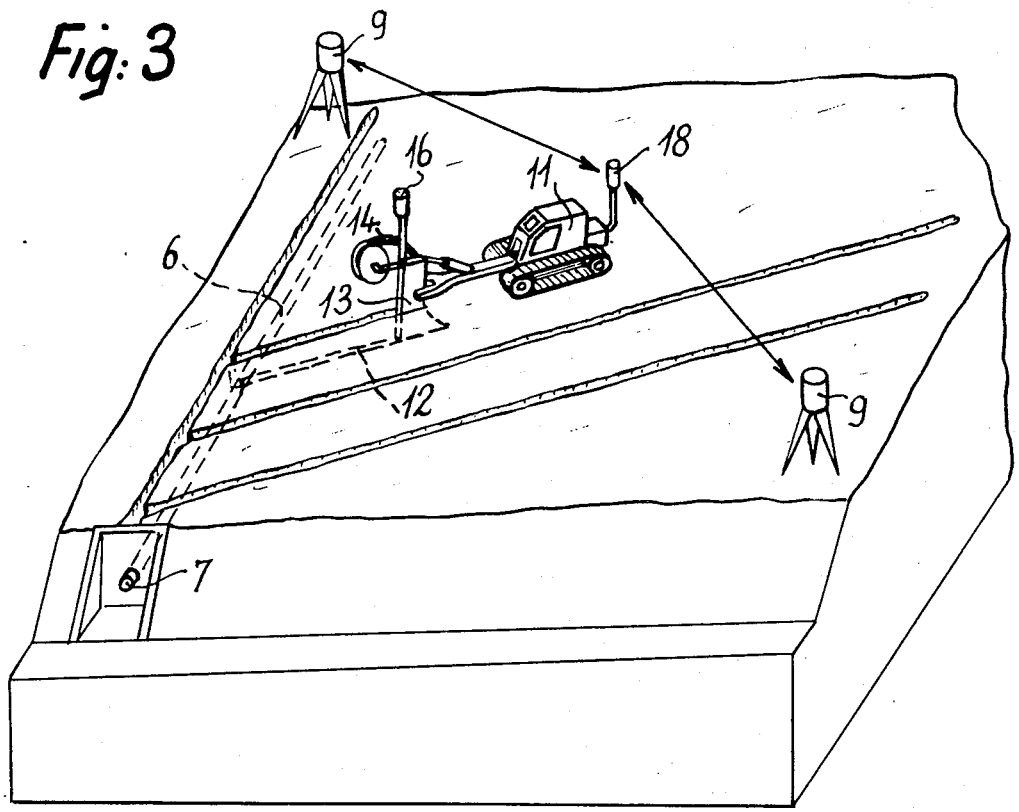
FIG. 3 is a schematic view in perspective illustrating the mode of planimetric guidance of a drain-laying machine at the time of application of the method.
Figure 1:
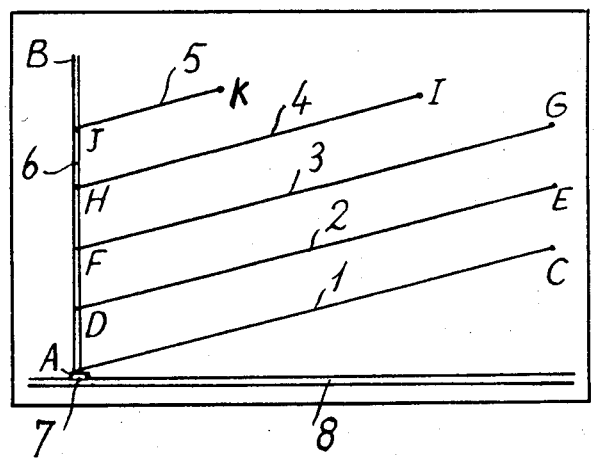
FIG. 1 is a schematic view of one example of a general layout plan relating to the development of a project for laying drainage elements.

These data are grouped together in successive sequences corresponding to the different rectilinear drain-sections of the project to be executed such as, for example, a drainage project of the type illustrated in FIG. 1. This project can comprise a series of parallel drains 1, 2 . . . 5 joined to a transverse header 6, the lower end 7 of which constitutes an outfall which discharges into a ditch 8. The characteristic points of a project of this type are therefore on the one hand the ends A and B of the header 6 and the ends C, D . . . K of the different drains.

The planimetric and altimetric coordinates of these different characteristic points are recorded with respect to reference parameters which consist:

on the one hand of two arbitrarily chosen reference points which will subsequently be represented on the ground by two radar-wave emitting beacons 9;

on the other hand of a reference plane which is also chosen arbitrarily and which will subsequently be represented on the ground by a rotating laser beam emitter 10.

Preferably, the planimetric coordinates of the different points at which special operations have to be performed are also recorded. By way of example, these special operations may relate to a change in nature of the drainage elements or to the incorporation of certain accessories, and so on.

In addition to the two aforementioned beacons 9 and the laser-beam emitter 10, the equipment for carrying out the method of guidance in accordance with the invention comprises a plurality of control devices and ancillary units which are installed on the machine to be guided, namely in the case under consideration a drain-laying machine 11 which is capable of laying drainage elements 12 in the conventional manner. This machine consists of a crawler-mounted self-propelled vehicle and a drain-laying tool hitched at the rear end thereof and designated by the general reference 13. This tool is capable of cutting a furrow in the ground and is associated with a drain-laying system which effects unwinding of a flexible pipe 14 from a drum and lays the pipe at the bottom of the furrow as the crawler machine advances. The means for hitching the drain-laying tool 13 comprise a mechanism for adjusting the height location of the tool by means of one or a number of control jacks 15, for example.

In addition, the drain-laying tool is equipped with a receiver 16 for detecting the passage of the rotating laser beam produced by the emitter 10. The receiver is mounted at the upper end of a telescopic mast 17, the height of which can be modified by an operating mechanism (not shown in the drawings). By means of a suitable control circuit, the receiver is capable of actuating the system for controlling the height location of the drain-laying tool 13.

In regard to the drain-laying machine 11, this machine is equipped with a receiver 18 for picking-up the radar waves emitted by the two fixed beacons 9. The receiver thus makes it possible to determine by trilateration the position of the crawler unit with respect to the two beacons in accordance with the method currently employed for guiding ships in a channel. The equipment installed on the crawler unit comprises a microprocessor control-module designated by the reference $M_1$ in the diagram of FIG. 2. This module is associated with a reading system L for receiving the magnetic recording medium S on which the different characteristics of the project to be carried out have previously been recorded. The reader is capable of transmitting to the control module $M_1$ the data which appears on said magnetic recording medium. The afore-mentioned module is capable of interpreting the data and consequently of controlling the different application devices which are operated in dependence on the module $M_1$.

Thus, module $M_1$ has the function of sorting the received data in order to transmit the planimetric data to a planimetric guidance device $M_2$ and in order to transmit the altimetric data to an altimetric guidance device $M_3$.

Figure 2:
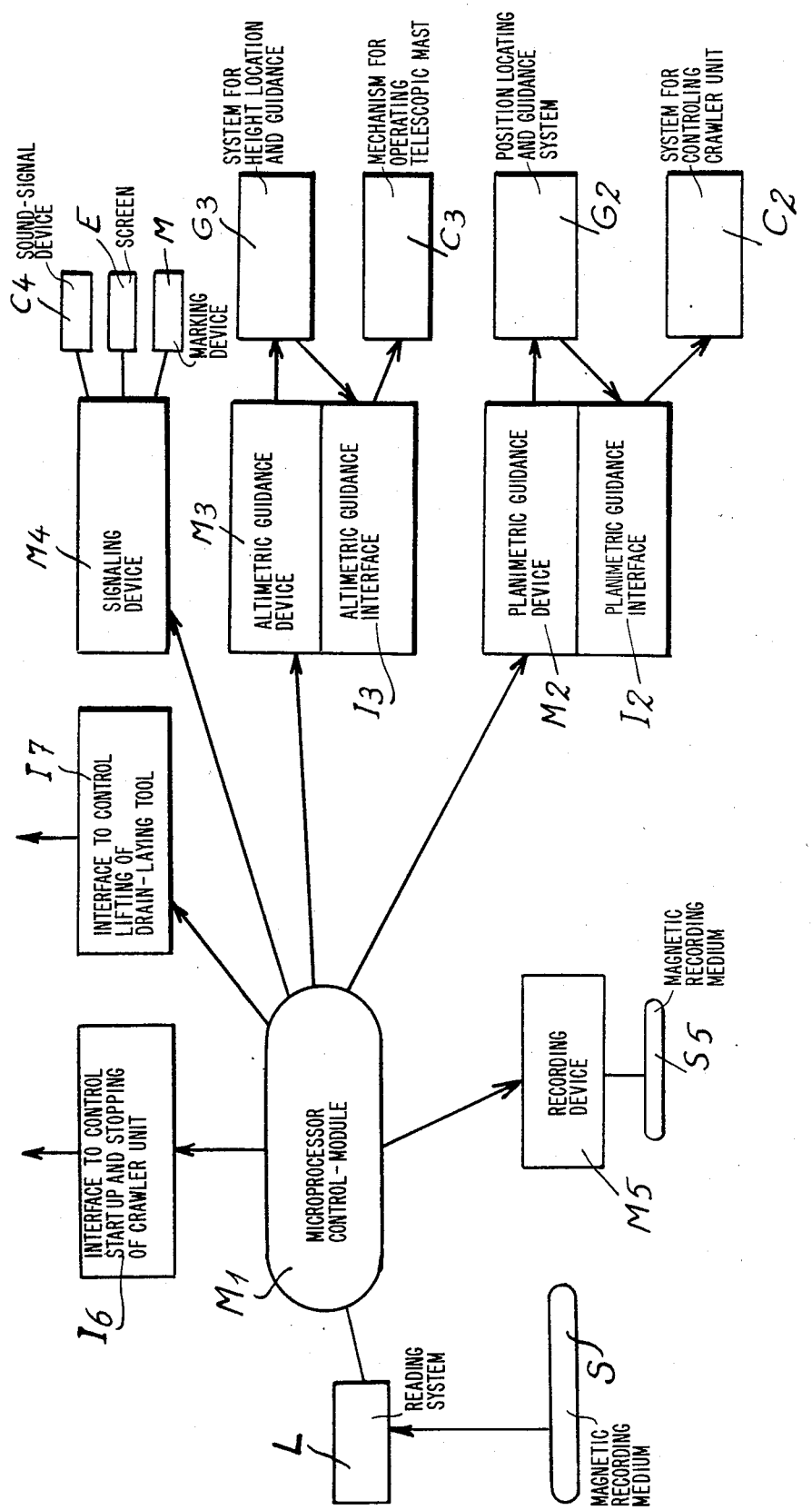
FIG. 2 is a schematic diagram of the equipment provided for the practical application of the method of guidance in accordance with the invention.

The first of these two application devices further comprises the beacons 9 as well as the receiver 18 which have been mentioned earlier and constitute a position-locating and guiding system designated by the general reference $G_2$ in the diagram of FIG. 2. However, this device also comprises a planimetric guidance interface $I_2$ which is connected on the one hand to the position-locating system $G_2$ and on the other hand to the system $C_2$ for controlling the direction of travel of the crawler unit.

Under these conditions, the device $M_2$ is capable of carrying out automatic guiding of the path followed by the crawler unit in order to form the different drainage pipe runs in accordance with the plan of work to be carried out, this being achieved by taking bearings from the two locating beacons 9.

So far as the altimetric guidance device $M_3$ is concerned, this device comprises the laser beam emitter 10 and the corresponding receiver 16 which are combined so as to form a system for height location and guidance of the drain-laying tool, this system being designated by the reference $G_3$ in the diagram of FIG. 2.

However, the device $M_3$ also comprises an altimetric guidance interface $I_3$ having the function of actuating the mechanism $C_3$ for operating the telescopic mast 17 which carries the receiver 16. The height of the receiver with respect to the drain-laying tool can thus be uniformly varied in order to produce a displacement of the tool along a line which has a given slope divergence with respect to the reference plane defined by the rotating laser beam issuing from the emitter 10, as a function of the instructions delivered by the control module $M_1$.

The control module also controls a signalling device $M_4$ for indicating certain special operations to be performed either during or after drain-laying work. This module comprises a sound-signal device $C_4$ for warning the crawler operator whenever a manual operation is necessary. A screen E provides a visual display of the nature of this special operation. The device M₄ further comprises a marking device M for indicating the position of certain operations on the ground by tracing marks thereon. As will readily be apparent, the marking and display device $M_4$ is controlled in dependence on the control module $M_1$ which transmits to said device $M_4$ all the data relating to this latter.

The control module is also capable of controlling a recording device $M_5$ which serves to transfer continuously to a magnetic recording medium $S_5$ the planimetric and altimetric coordinates which have really been followed during performance of field operations. This will permit subsequent automatic marking of the drain-laying execution plan on a drawing-board.

The equipment in accordance with the invention further comprises specific interfaces, especially an interface $I_6$ for control of startup and stopping of the crawler unit as well as an interface $I_7$, the function of which is to control lifting of the drain-laying tool 13 at the end of each drain section and lowering of the tool into position at the start of the following section and at the predetermined depth in accordance with the recorded data transmitted by the control module $M_1$.

For the practical application of the method in accordance with the invention on the drainage site by means of the equipment described in the foregoing, it is first of all necessary to install on the ground the two beacons 9 which are intended to serve as fixed reference points (datum points) as well as the laser beam emitter 10.

The emitter 10 must be so arranged as to ensure that its reference plane is roughly parallel to the natural ground or in other words that the value and direction of its maximum slope coincide with those of the natural ground. The next step consists in acquiring from the control module $M_1$ the points of installation of the fixed beacons 9 and the characteristics of the reference plane defined by the rotating laser beam (value and orientation of its maximum slope).

After those preliminary operations, the equipment in accordance with the invention is in readiness for the performance of all desired guiding operations. In fact, the control module $M_1$ communicates to the planimetric guidance device $M_2$ the coordinates of the origin and end points of each drain section. During forward travel of the crawler unit, the device $M_2$ then computes the exact coordinates of the crawler unit and compares them with those of the design path of travel for consequently correcting the actual path of travel of the crawler unit, this being achieved by means of the interface $I_2$ in order to produce action on the control system of the crawler unit.

Furthermore, the control module $M_1$ controls the height settings of the drain-laying tool 13 in order to place this latter at the predetermined height at the beginning of each drain section. The module $M_1$ then communicates to the altimetric guidance device $M_3$ the value of slope of the first segment of the longitudinal profile of the drain section. The guidance device computes and imposes on the incrementation system of the laser receiver the altimetric guidance differential with respect to the laser reference plane, which is necesary in order to conform to this slope.

Figure 4:
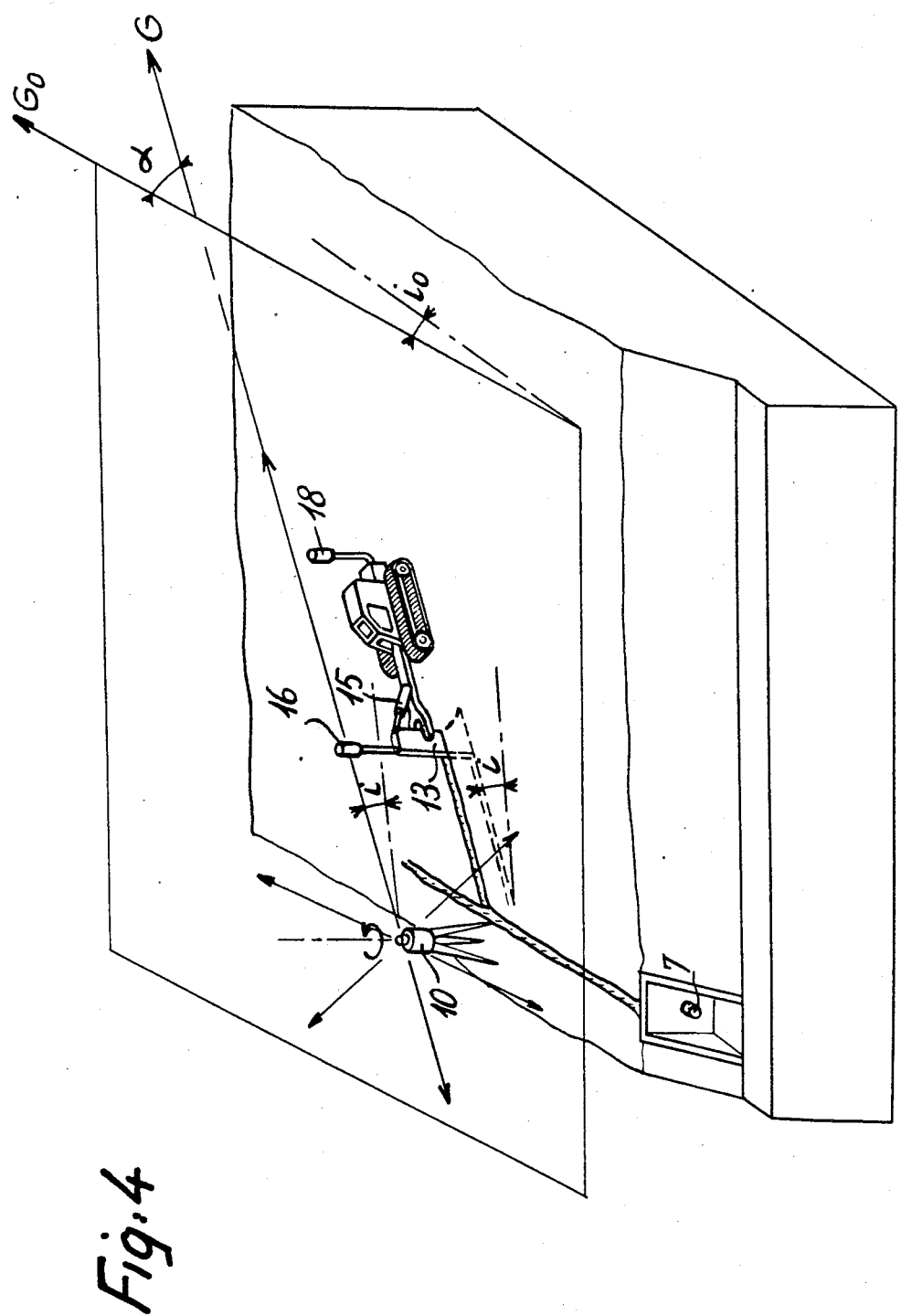
FIG. 4 is a similar view illustrating the mode of altimetric guidance of the drain-laying tool of the machine.

It is worthy of note in this connection that the initialization phase of this equipment permits storage in memory of the value $i_o$ of the maximum slope of the reference plane of the rotating laser beam as well as the azimuth $G_o$ of its orientation (as shown in FIG. 4).

While work is in progress, a knowledge of the azimuth G of the direction of the drain section (computed from the coordinates of the origin and end points of the section) enables the altimetric guidance device $M_3$ to compute the value i of the guidance slope imposed by the rotating laser beam, by means of the trigonometric formula:

$$i = i_o \times \cos (G - G_o).$$

Moreover, if the reference plane of the rotating laser beam imposes a guidance slope i and if it is desired to set the drain-laying tool at an angle of slope I, the incrementation system controlled by the altimetric guidance device $M_3$ makes it possible to impose on the telescopic mast 17 of the receiver 16 a uniform extension or reduction in length corresponding to the guidance differential or in other words (I−i) expressed in mm/m (as shown in FIG. 5).

Furthermore, as has already been explained earlier, the device $M_4$ has the intended function of producing signals while work is in progress in order to indicate the need for performance of special operations. Finally, the device $M_5$ permits recording of the exact characteristics of operations which have really been carried out in order to draw up a plan of completed drain-laying operations.

Under these conditions, the method and equipment in accordance with the invention permit effective and automatic performance of all desired guiding operations while avoiding all the disadvantages inherent in the methods at present in use for carrying out drainage work. However, the method and equipment considered can also be employed for the execution of other earthmoving operations in which similar problems are encountered such as, for example, laying of cables or underground piping and more generally all excavation work.

It should finally be noted that the equipment in accordance with the invention is not limited to the example of construction described in the foregoing and can give rise to a number of alternative forms of construction and modifications, particularly as a function of the exact nature of the work to be performed. Thus in regard to the system of position-location of the earthmoving machine, the beacons used for emitting radar waves can be replaced by three beacons for emitting radio waves of a different type, in which case position determination is carried out by radiogoniometry.

What is claimed is:

1. Method for automatic guidance of an earthmoving machine in accordance with predetermined planimetric and altimetric data profiles, said method comprising the following steps: disposing on the ground fixed beaconing elements (9) and a rotary laser beam emitter for defining a predetermined reference plane; disposing on the earthmoving machine (11) a first device (M2) of the planimetric guidance of the machine and a second device (M3) for the altimetric guidance of an earthmoving tool (13) carried by said machine, said first device (M2) controlling a steering system of the machine (11) and said second device (M3) controlling the vertical position of the tool (13); and further disposing on the machine (11) a control module (M1) for transmitting previously stored planimetric and altimetric specifications for the work to be performed on the ground so as to control through said first device (M2) the direction of the travel of the machine (11) and to control through said second device (M3) the vertical position of the tool (13) with respect to said fixed locating beacons and to said plane defined by said rotating laser beam, respectively.

2. The method for automatic guidance of an earthmoving machine according to claim 1, wherein said planimetric and altimetric data profiles are recorded on a detachable magnetic recording medium (S).

3. The method for automatic guidance of an earthmoving machine according to claim 1, wherein the relative altimetric data resulting from the ground slope and the orientation of the line of major inclination of the ground with respect to the plane defined by said laser beams are computed by said second device (M3), whereby, in accordance with the planimetric data acquired by said first device (M2) te absolute value of the altimetric reference of the machine is constantly determined.

4. The method for automatic guidance according to claim 2, wherein position coordinates on said ground corresponding to predetermined and specific operations are further recorded on said magnetic support (S), and a ground marking device (M) is associated with said control module (M1) for indicating on the ground positions where said special operations have been performed.

5. The method for automatic guidance according to claim 1, wherein a third device (M5) records the planimetric and altimetric data of work actually performed by said earthmoving machine on a magnetic recording medium (S5) thereby permitting automatic marking of the work already performed on a drawing board so that repetition of the work by another machine is possible if necessary.

6. Control equipment to be installed on an earthmoving machine for the automatic guidance thereof, said equipment comprising in combination: a microprocessor control module (M1) which receives and transmits data stored in a magnetic recording device (S), said data including planimetric and altimetric data concerning work to be performed by said earthmoving machine; a planimetric guidance device (M2) responsive to said data transmitted by said control module (M1) and which controls the steering system of the earthmoving machine with respect to fixed reference points consisting of locating beacons (9) disposed at suitable locations on the ground; and an altimetric guidance device (M3) responsive to data transmitted by said control module (M1) and which controls means adjusting the vertical position of a working tool (13) with respect to a reference plane defined by a rotating laser beam issuing from an emitter (10).

7. Control equipment according to claim 6, further comprising a signaling device (M4) controlled by said control module (M1) which signals certain specific operations to be performed on the ground, said signaling device (M4) controlling a ground-marking device for indicating the positions of certain operations performed on the ground.

8. Control equipment according to claim 6, further comprising a recording device (M5) which records on a magnetic recording medium (S5) planimetric and altimetric data coordinates of work actually performed on the ground.

9. Control equipment according to claim 6, wherein said beacons (9) emit radar waves, said device (M2) comprising means (G2) for locating the position of the earthmoving machine, said means (G2) comprising the beacons and a receiver (18) installed on said machine.

10. Control equipment according to claim 9, wherein said planimetric guidance device further comprises a planimetric guidance interface (I2) connected to the locating means (G2) and to a system (C2) for controlling the steering system of said earthmoving machine (11).

11. Control equipment according to claim 6, wherein said altimetric guidance device (M3) further comprises a receiver (16) for detecting passage of said rotary laser beam from the emitter (10), said receiver being secured to a telescopic mast (17) carried by said working tool, the height of said receiver on said mast being modified by means of a mechanism responsive to said altimetric guidance device (M3).

12. Control equipment according to claim 11, wherein said altimetric guidance device (M3) further comprises an interface (I3) connected to a means (C3) for operating the telescopic mast (17) which carries the receiver (16), wherein said working tool (13) is controlled to follow an altimetric profile having a predetermined angular difference with respect to a reference plane defined by said rotating laser beam.

* * * * *